United States Patent [19]

Letcher et al.

[11] Patent Number: 5,415,145
[45] Date of Patent: May 16, 1995

[54] START FUEL DECAY FOR A FLEXIBLE FUEL COMPENSATION SYSTEM

[75] Inventors: John E. Letcher, Chelsea; Stuart M. Davis, Bloomfield Hills, both of Mich.

[73] Assignee: Chrysler Corporation, Highland Park, Mich.

[21] Appl. No.: 57,247

[22] Filed: May 4, 1993

[51] Int. Cl.$^6$ ............................................ F02M 41/06
[52] U.S. Cl. .................................................. 123/491
[58] Field of Search .......... 123/491, 1 A, 478, 179.16, 123/491

[56] References Cited

U.S. PATENT DOCUMENTS

| | | |
|---|---|---|
| 5,027,779 | 7/1991 | Nishiyama ........................... 123/491 |
| 5,119,671 | 6/1992 | Kopera ................................. 73/116 |
| 5,142,479 | 8/1992 | Poirier et al. ........................ 123/491 |
| 5,150,683 | 9/1992 | Depa et al. ........................... 123/417 |
| 5,163,408 | 11/1992 | Nemoto ................................. 123/491 |
| 5,186,149 | 2/1993 | Kitajima et al. ..................... 123/491 |
| 5,205,255 | 4/1993 | Yamagata et al. ................... 123/491 |
| 5,289,808 | 3/1994 | Takahashi et al. ................... 123/491 |

*Primary Examiner*—Henry C. Yuen
*Assistant Examiner*—Thomas N. Moulis
*Attorney, Agent, or Firm*—Mark P. Calcaterra

[57] ABSTRACT

A flexible fuel compensation system including a method of start fuel decay. The start fuel decay method interpolates decay rates based on the coolant temperature. The decay rate is then subtracted from the decayed start fuel pulsewidth until it reaches a predetermined value.

12 Claims, 12 Drawing Sheets

START FUEL DECAY FOR A FLEXIBLE FUEL COMPENSATION SYSTEM

BACKGROUND OF INVENTION

1. Field of the Invention

The present invention relates generally to fuel control systems and, more specifically, to a flexible fuel compensation system for an internal combustion engine.

2. Description of the Related Art

The automotive industry has been under increasing demands to develop an automotive vehicle that can operate on different fuels such as gasoline and alcohol. However, internal combustion engines must have selectively adjustable parameters for efficient combustion when operating on the different fuels. One attempt to meet this demand is an optical refraction index sensor which utilizes the relationship between the percentage of alcohol in a fuel mixture and the angle of light refraction through the fuel mixture.

Currently, only methanol and ethanol types of alcohols are viable fuel alternatives to gasoline since both are able to create a similar amount of power in spark ignited, internal combustion engines. Thus, in order to accommodate the fluctuating supply of alcohol based fuels, automotive vehicle manufacturers have to modify their current fuel control systems to accept alcohol based fuels or gasoline/alcohol fuel mixtures.

SUMMARY OF THE INVENTION

It is, therefore, one object of the present invention to provide a system of flexible fuel compensation.

It is another object of the present invention to provide a flexible fuel compensation system which has a greater pumping efficiency with gasoline and alcohol based fuels.

It is yet another object of the present invention to provide a flexible fuel compensation system that makes adjustments based on fuel blend vaporization.

It is still another object of the present invention to provide a flexible fuel compensation system that compensates for the high percent of oxygen found in alcohol based fuels.

To achieve the foregoing objects, the present invention is a flexible fuel compensation system for an internal combustion engine. The flexible fuel compensation system includes a method that will compensate for the differences in an engine pumping efficiency between gasoline and alcohol based fuels. The system also includes a step which will adjust for the differences in intrinsic vaporization characteristics between varying fuel blends. The system will further include a transient fuel vaporization multiplier which adds extra fuel under cold engine operation. The system also includes a step to compensate for the natural lean bias which occurs with fuels containing a high percentage of methanol, due to its high oxygen content.

One advantage of the present invention is that a flexible fuel compensation system is provided for an internal combustion engine. Another advantage of the present invention is that the flexible fuel compensation system allows the internal combustion engine to operate on different fuels such as gasoline and alcohol or mixtures thereof.

Other objects, features and advantages of the present invention will be readily appreciated as the same becomes better understood after reading the following description taken in conjunction with the accompanying drawings.

BRIEF DESCRIPTION OF THE DRAWINGS

FIG. 8 is a flowchart of a subroutine for the method of FIGS. 2 and 3.

DESCRIPTION OF THE PREFERRED EMBODIMENT(S)

Figure 1:
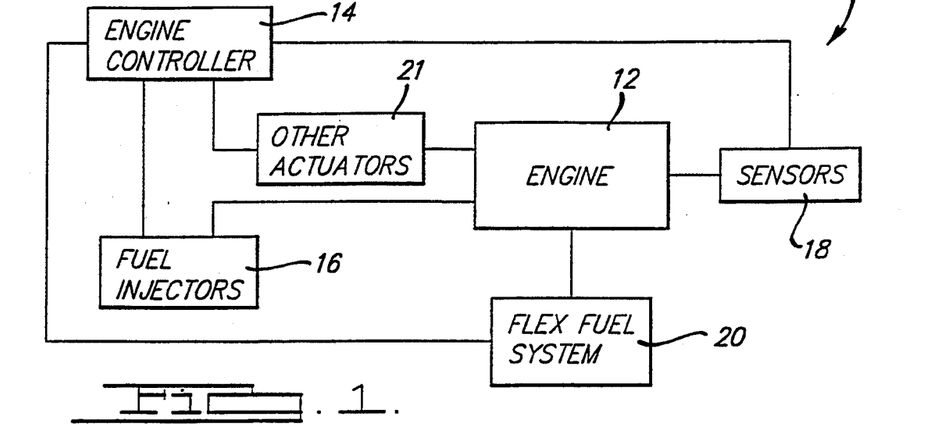
FIG. 1 is a schematic diagram of hardware for a flexible fuel compensation system according to the present invention.

Referring to FIG. 1, a flexible fuel compensation system 10 is illustrated in operational relationship with an engine 12, such as an internal combustion engine, and includes an engine controller 14, a plurality of electronic fuel injectors 16, sensors 18 such as a flex fuel sensor, a throttle sensor, a manifold absolute pressure sensor, a coolant sensor, a charge temperature sensor, shut off or down timer, etc., a flex fuel system 20, and other actuators 21 such as a purge corruption system. An example of a flex fuel system is disclosed in U.S. Pat. No. 5,119,671 to Kopera and an example of a purge corruption system is disclosed in U.S. Pat. No. 4,821,701 to Nankee, II et al., the disclosures of both patents are hereby incorporated by reference. Preferably, the engine 12 has a plurality of spark ignited cylinders (not shown) arranged in at least two banks such as Bank-1 and Bank-2 for a V-6 cylinder engine. It should be appreciated that the engine controller 14 includes a microprocessing, memory, input/output devices, bus lines, etc. It should also be appreciated that the fuel injectors 16, sensors 18 and flex fuel system 20 are connected to the engine controller 14 and communicate with the engine controller 14 in order to control fuel injection pulsewidths in the duty cycle sent to the electronic fuel injectors 16.

Figure 2:
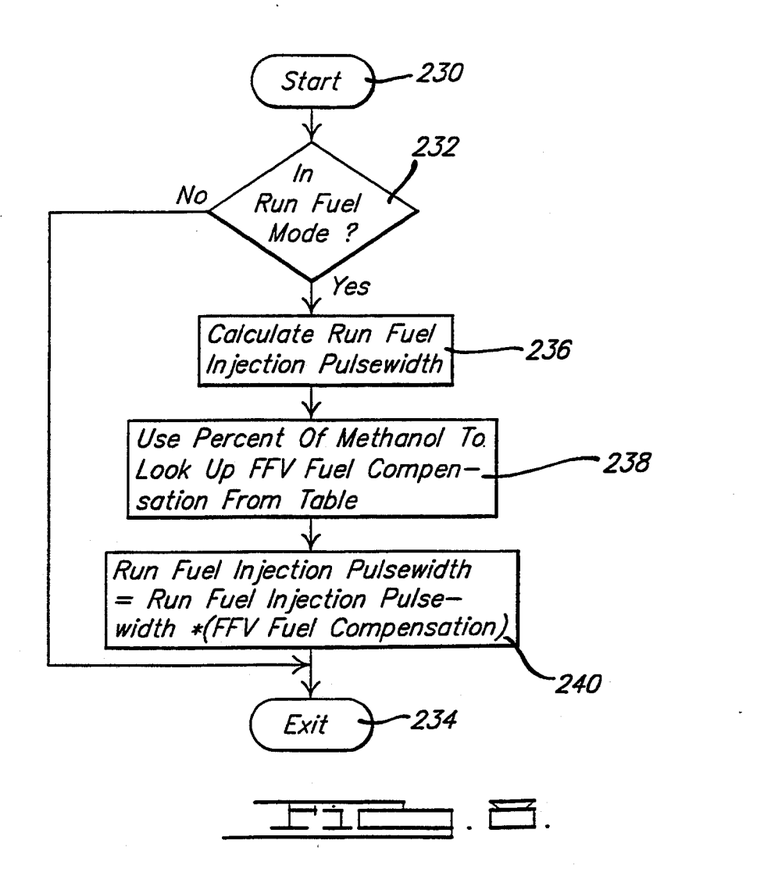
FIGS. 2 and 3 are flowcharts of a method of flexible fuel compensation control for the flexible fuel compensation system of FIG. 1.
Figure 3:
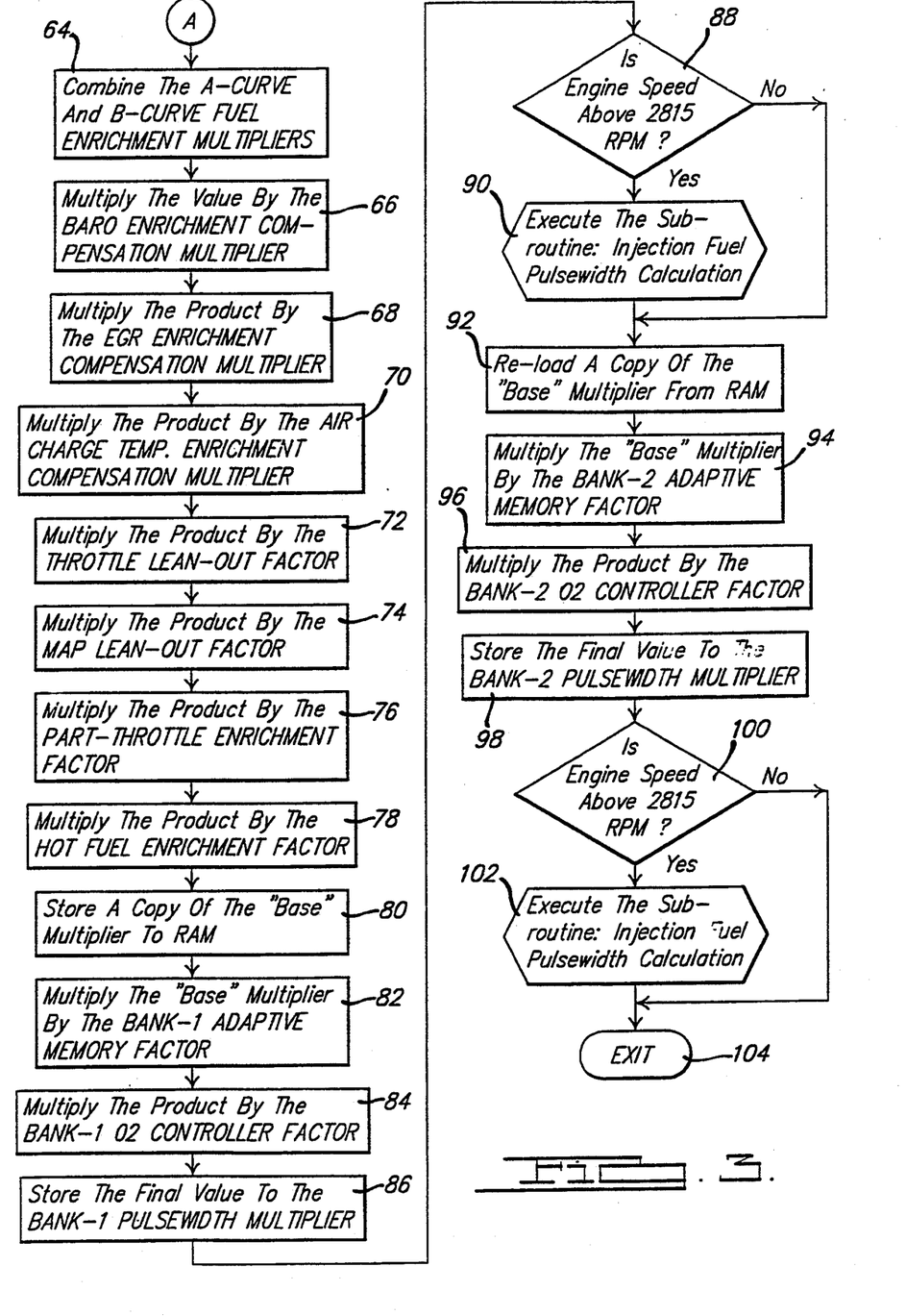

Referring to FIGS. 2 and 3, a flowchart for a method of flexible fuel compensation control is illustrated for the flexible fuel compensation system of FIG. 1. The methodology starts in bubble 30 and advances to decision block 32. In decision block 32, the methodology determines whether the vehicle is configured for "flex-fuel". This is accomplished by a de-select flag (calibratible). If so, the methodology advances to decision block 34 and calculates a (B-curve) flexible fuel vehicle (FFV) vaporization compensation multiplier to be described. The methodology then advances to block 36 and calculates an (A-curve) FFV vaporization compensation multiplier to be described. The methodology then advances to block 38 and calculates a FFV fuel blend energy content compensation multiplier to be described in connection with FIG. 8. The methodology advances to block 40 and calculates a transient fuel FFV vaporization compensation multiplier to be described. The methodology then advances to block 42 and calculates a FFV pumping efficiency multiplier to be described. The methodology then advances to block 44 and calculates a total flex fuel pulsewidth multiplier by multiplying together the multipliers for blocks 34 through 42. The methodology then advances to block 48 to be described.

In decision block 32, if the vehicle is not configured for flex fuel, the methodology advances to block 46 and sets all flex-fuel multipliers in blocks 34 through 42 to a predetermined value such as 1.0. From blocks 44 and 46, the methodology advances to block 48 and calculates an A-curve "time based" fuel enrichment multiplier from a table stored in memory as a function of time since start of the engine 12 and coolant temperature. The methodology then advances to block 50 and multiplies the value from block 48 by the A-curve FFV vaporization compensation multiplier from block 36 and temporarily stores the result in memory. The methodology then advances to diamond 52 and determines whether a throttle (not shown) of the engine 12 is at wide open throttle (WOT) by a signal from the throttle sensor. If the throttle is not at wide open throttle, the methodology advances to block 54 and calculates a B-curve (coolant base) fuel enrichment multiplier from a table stored in memory as a function of coolant temperature. If not, the methodology advances to diamond 56 and determines whether the throttle is closed by the signal from the throttle sensor. If the throttle is closed, the methodology advances to block 58 and calculates a B-curve (coolant based) fuel enrichment multiplier from a table stored in memory as a function of MAP and coolant temperature. If the throttle is not closed, the methodology advances to block 60 and calculates a B-curve (coolant based) fuel enrichment multiplier from another table stored in memory at a function of MAP and coolant temperature.

From blocks 54, 58 and 60, the methodology advances to block 64 and combines the A-curve and B-curve fuel enrichment multipliers from blocks 48 and either blocks 54, 58 and 60. The methodology then advances to block 66 and multiplies the value of block 64 by a barometric enrichment compensation multiplier from a table stored in memory as a function of barometric pressure. The methodology then advances to block 68 and multiplies the product of block 66 by an EGR enrichment compensation multiplier from a table stored in memory as a function of MAP and engine speed. The methodology then advances to block 70 and multiplies the product of block 68 by an air charge temperature enrichment compensation multiplier from a table stored in memory as a function of air charge temperature. The methodology then advances to block 72 and multiplies the product of block 70 by a predetermined throttle lean-out factor stored in memory. The methodology then advances to block 74 and multiplies the product of block 72 by a predetermined manifold absolute pressure (MAP) lean-out factor stored in memory. The methodology then advances to block 76 and multiplies the product of block 74 by a predetermined part-throttle enrichment factor stored in memory. The methodology then advances to block 78 and multiplies the product of block 76 by a hot fuel enrichment factor to be described in connection with FIGS. 9 through 16. The methodology then advances to block 80 and stores a copy of the "base" multiplier of block 78 to memory. The methodology then advances to block 82 and multiplies the base multiplier of block 78 by a Bank-1 adaptive memory factor. The methodology then advances to block 84 and multiplies the product of block 82 by a Bank-1 oxygen controller factor. The methodology then advances to block 86 and stores the final value of block 84 as the Bank-1 pulsewidth multiplier. The methodology then advances to decision block 88 and determines whether engine speed is greater than a predetermined speed such as 2815 RPM. If not, the methodology advanced to block 92 to be described. If so, the methodology advances to block 90 and executes the subroutine Injection Fuel Pulsewidth Calculation in FIG. 4 to be described to calculate an injection pulsewidth.

After blocks 88 and 90, the methodology then advances to block 92 and reloads a copy of the base multiplier of block 80 from memory. The methodology then advances to block 94 and multiplies the base multiplier by a Bank-2 adaptive memory factor. The methodology then advances to block 96 and multiplies the product of block 94 by a Bank-2 oxygen controller factor. The methodology then advances to block 98 and stores the final value of block 96 as the Bank-2 pulsewidth multiplier. The methodology then advances to decision block 100 and determines whether the engine speed is above the predetermined speed. If not, the methodology returns or exits through bubble 104. If so, the methodology advances to block 102 and executes the subroutine Injection Fuel Pulsewidth Calculation in FIG. 4 to be described to calculate an injection pulsewidth. After block 102, the methodology returns or exits through bubble 104.

Figure 4:
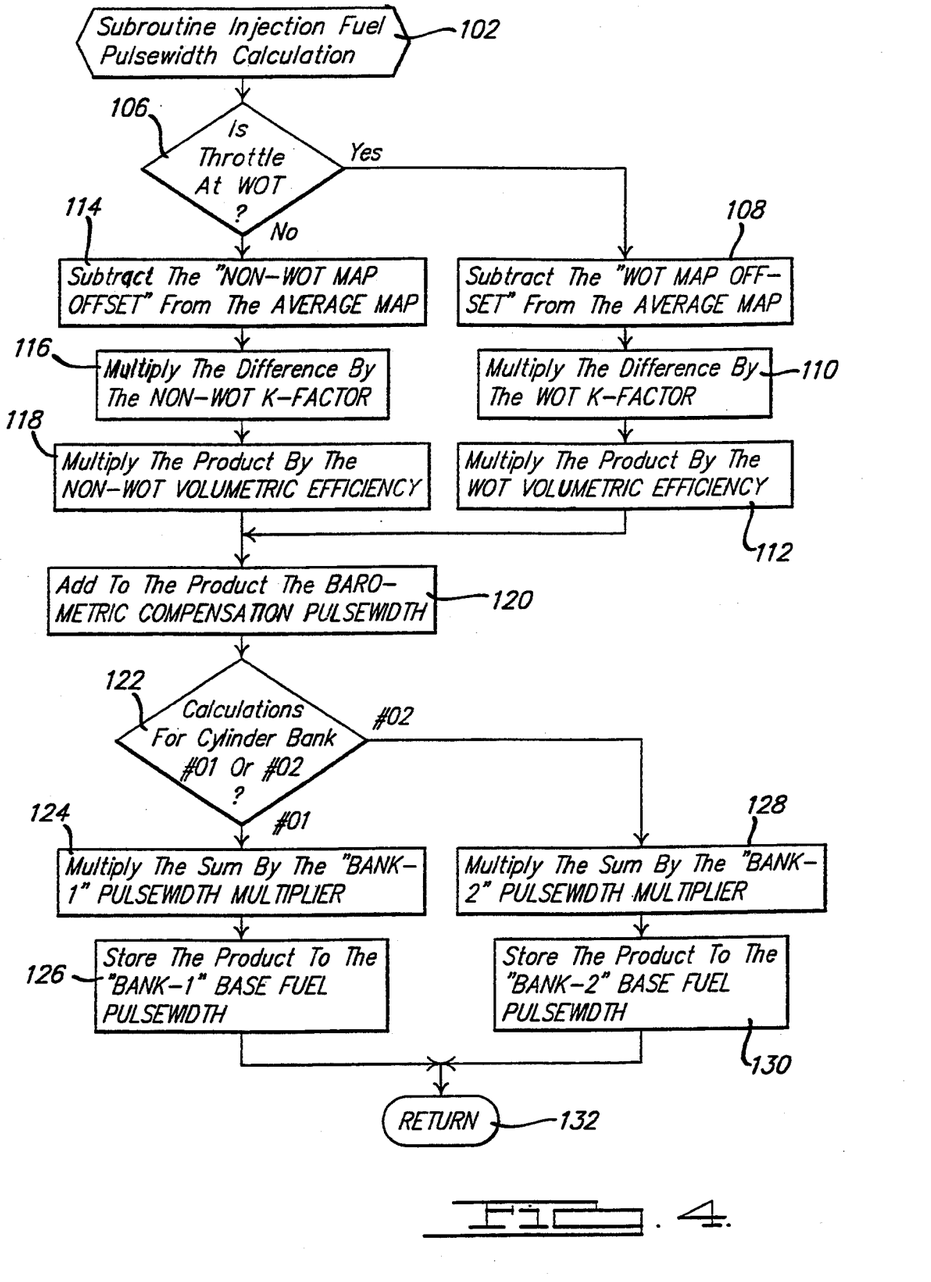
FIG. 4 is a flowchart of a subroutine for the method of FIGS. 2 and 3.

In FIG. 4, the methodology for the subroutine Injection Fuel Pulsewidth Calculation is illustrated. The subroutine Injection Fuel Pulsewidth Calculation is used to calculate the injection fuel pulsewidth for the fuel injectors 16. Through block 102 of the subroutine Injection Fuel Pulsewidth Calculation, the methodology advances to decision block 106 and determines whether the throttle is at wide open throttle as previously described. If the throttle is at wide open throttle, the methodology advances to block 108 and subtracts a predetermined WOTMAP offset from an average reading of MAP. The methodology then advances to block 110 and multiplies the difference of block 108 by a predetermined WOT K-factor stored in memory. The methodology then advances to block 112 and multiplies the product of block 110 by a WOT volumetric efficiency from a table stored in memory as a function of MAP and engine speed. If the throttle is not at WOT, the methodology advances to block 114 and subtracts a predetermined non-WOT MAP offset from the average reading of MAP. The methodology then advances to block 116 and multiplies the difference of block 114 by a predetermined non-WOT K-factor. The methodology then advances to block 118 and multiplies the product of block 116 by the non-WOT volumetric efficiency.

From blocks 112 and 118, the methodology advances to block 120 and adds a barometric compensation pulsewidth from a table stored in memory as a function of barometric pressure to the product of either blocks 118 or 120. The methodology then advances to decision block 122 and determines whether the calculations are for cylinder Bank-1 or 2, for example, by looking for a flag. If the calculations are for cylinder Bank-1, the methodology advances to block 124 and multiplies the sum of block 120 by the Bank-1 pulsewidth multiplier of block 86. The methodology then advances to block 126 and stores the product of block 124 to memory as the Bank-1 base fuel pulsewidth. The methodology then returns or exits through bubble 132.

In decision block 122, if the calculations are for cylinder Bank-2, the methodology advances to block 128 and multiples the sum of block 120 by the Bank-2 pulsewidth multiplier of block 98. The methodology then advances to block 130 and stores the product of block 128 to memory as the Bank-2 base fuel pulsewidth. The methodology then returns or exits through bubble 132.

Figure 5:
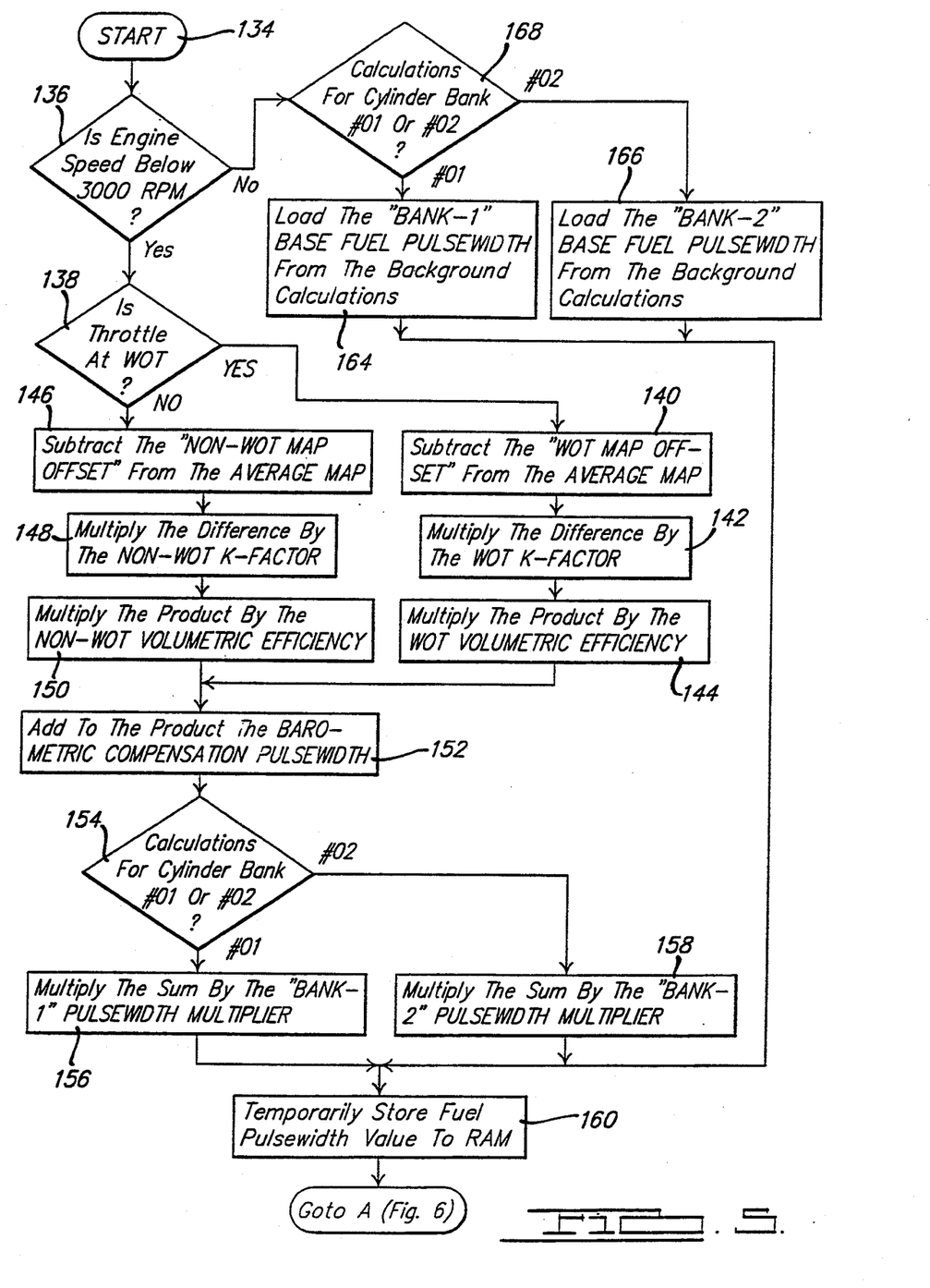
FIGS. 5 and 6 are flowcharts of a method for executing calculations of FIGS. 2 and 3.
Figure 6:
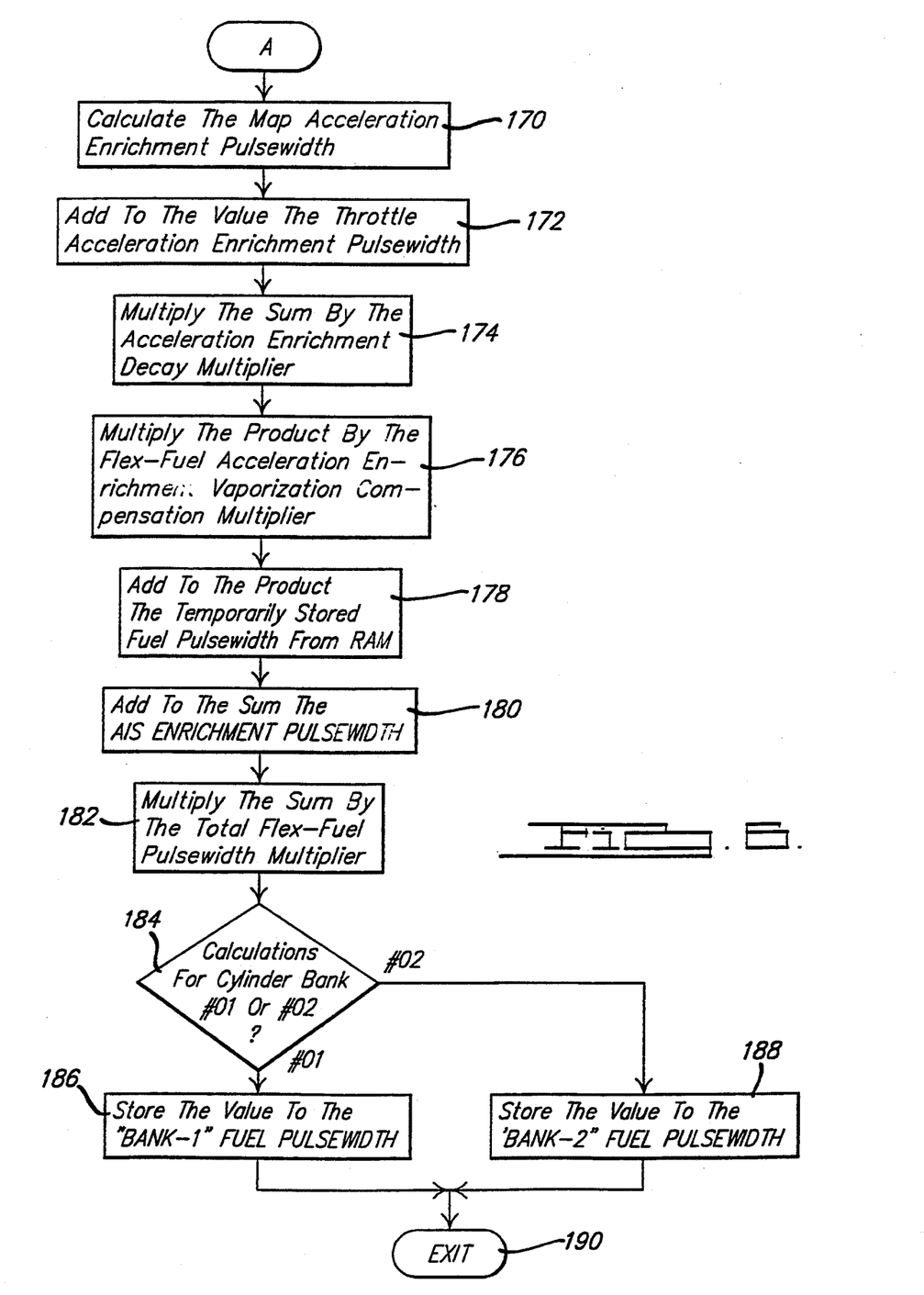

Referring to FIGS. 5 and 6, a methodology is illustrated to execute the run mode of the base fuel pulsewidth calculations of FIGS. 2 through 4. The methodology is a crank interrupt routine that begins in block 134 and advances to decision block 136. In decision block 136, the methodology determines if the engine speed is below a predetermined value such as three thousand (3000) RPM. If the engine speed is below the predetermined value, the methodology advances to decision block 138 and determines if the throttle is at wide open throttle as previously described. If the throttle is at wide open throttle, the methodology then advances to block 140 and subtracts a predetermined WOT MAP offset from the average reading of MAP. The methodology then advances to block 142 and multiplies the difference of block 140 by a predetermined WOT K-factor. The methodology advances to block 144 and multiplies the product of block 142 by a predetermined WOT volumetric efficiency. The methodology then advances to block 152 to be described.

In decision block 138, if the throttle was not at wide open throttle, the methodology advances to block 146 and subtracts a predetermined non-WOT MAP offset from the average reading of MAP. The methodology then advances to block 148 and multiplies the difference of block 146 by a predetermined non-WOT K-factor. The methodology then advances to block 150 and multiplies the product of block 148 by a predetermined non-WOT volumetric efficiency. From block 144 and block 150, the methodology then advances to block 152 and adds the product of either block 150 or 144 to a barometric compensation pulsewidth value from a table stored in memory as a function of barometric pressure.

From block 152, the methodology then advances to decision block 154 and determines whether the calculations for blocks 140 through 152 were for cylinder Bank-1 or 2. If the calculations are for cylinder Bank-1, the methodology advances to block 156 and multiplies the sum of block 152 by the Bank-1 pulsewidth multiplier from block 86. If the calculations are for cylinder Bank-2, the methodology advances to block 158 and multiplies the sum of block 152 by the Bank-2 pulsewidth multiplier from block 98. From either of blocks 156 or 158, the methodology advances to block 160 and temporarily stores the fuel pulsewidth value of either blocks 156 or 158 to memory.

In decision block 136, if the methodology determines that the engine speed is not below the predetermined value, the methodology advances to decision block 162 and determines if the calculations prior to block 136 were for cylinder Bank-1 or 2. If the calculations were for cylinder Bank-1, the methodology advances to block 164 and loads the Bank-1 base fuel pulsewidth of block 126 from memory. If the calculations are for cylinder Bank-2, the methodology advances to block 166 and loads the Bank-2 base fuel pulsewidth of block 130 from memory. From blocks 164 and 166, methodology then advances to block 160 previously described.

From block 160, the methodology advances to block 170 and calculates a MAP Acceleration Enrichment pulsewidth value based on rate of change of map and coolant temperature. The methodology advances to block 172 and adds a predetermined throttle acceleration enrichment pulsewidth value to the MAP acceleration enrichment pulsewidth value of block 170. The methodology advances to block 174 and multiplies the sum of block 172 by a predetermined acceleration enrichment decay multiplier stored in memory. The methodology then advances to block 176 and multiplies the product of block 174 by a predetermined flex-fuel acceleration enrichment vaporization compensation multiplier stored in memory. The methodology advances to block 178 and adds the fuel pulsewidth value of block 160 to the product of block 176. The methodology advances to block 180 and adds a predetermined AIS enrichment pulsewidth stored in memory to the sum of block 178. The methodology then advances to block 182 and multiplies the sum of block 180 by the total flex-fuel pulsewidth multiplier from block 44. The methodology advances to decision block 184 and determines if the calculations for blocks 170 through 182 are for cylinder Bank-1 or 2. If the calculations are for cylinder Bank-1, the methodology advances to block 186 and stores the value of block 182 to memory as the "Bank-1" fuel pulsewidth. If the calculations are for cylinder Bank-2, the methodology advances to block 188 and stores the value of block 182 to memory as the "Bank-2" fuel pulsewidth. From either blocks 186 and 188, the methodology enters bubble 190 and exits the subroutine. It should be appreciated that the engine controller 14 uses the values of block 186 and 188 to control the duty cycle to the fuel injectors 16.

Figure 7:
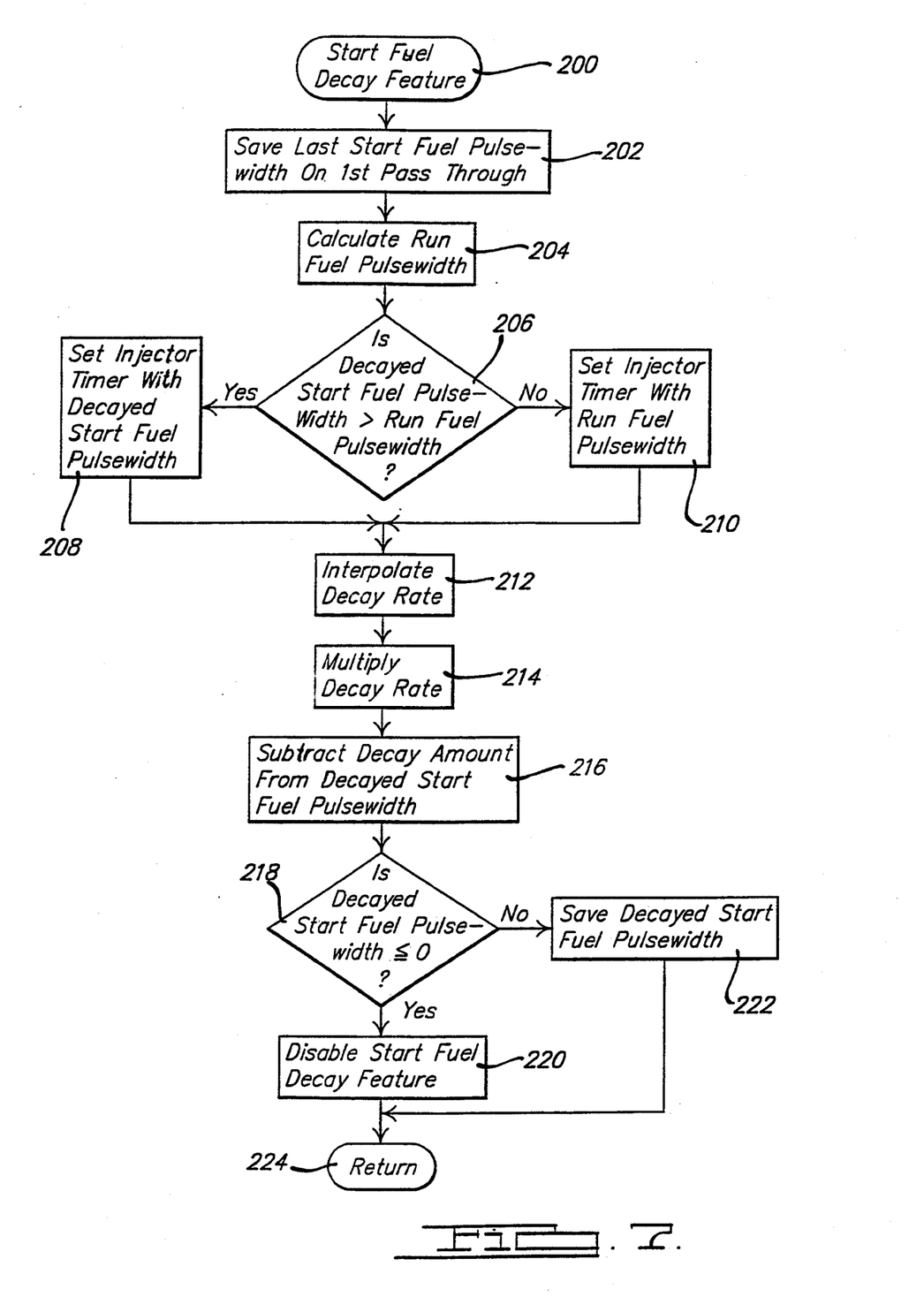
FIG. 7 is a flowchart of a subroutine for the method of FIGS. 2 and 3.

Referring to FIG. 7, the methodology includes a start fuel decay routine which operates simultaneously with the beginning of the methodology of FIGS. 5 and 6. The start fuel decay routine or methodology begins in block 200 and advances to block 202 and saves a last or previous start fuel pulsewidth on a first pass through the routine. The methodology then advances to block 204 and calculates a run fuel pulsewidth, according to FIGS. 2 through 6. The methodology advances to decision block 206 and determines if the decayed start fuel pulsewidth is greater than the run fuel pulsewidth of block 204. If the decayed start fuel pulsewidth is greater than the run fuel pulsewidth, the methodology advances to block 208 and sets a fuel injector timer with the decayed start fuel pulsewidth. The methodology then advances to block 212 to be described.

In decision block 206, if the decayed start fuel pulsewidth is not greater than the run fuel pulsewidth, the methodology advances to block 210 and sets the fuel injector timer with the run fuel pulsewidth. From blocks 208 and 210, the methodology advances to block 212 and interpolates a decay rate of the fuel pulsewidth of blocks 208 and 210 versus the coolant temperature. The methodology then advances to block 214 and multiplies the decay rate of block 212 by a number of cylinder events since the start to run transfer has occurred. The methodology then advances to block 216 and subtracts the decay amount from the decayed start fuel pulsewidth of block 208.

From block 216, the methodology advances to decision block 218 and determines if the decayed start fuel pulsewidth is less than or equal to a predetermined value such as zero. If the decayed start fuel pulsewidth is less than or equal to the predetermined value, the methodology advances to block 220 and disables the start fuel decay routine of FIG. 7. If the decayed start fuel pulsewidth is not less than or equal to the predetermined value, the methodology advances to block 222 and saves the decayed start fuel pulsewidth of block 216 to memory. From blocks 220 and 222, the methodology enters bubble 224 and returns.

Referring to FIG. 8, the FFV fuel blend energy content compensation multiplier of block 38 is illustrated. This subroutine will adjust the run fuel injection pulsewidth values for the differences in intrinsic energy content between varying fuel blends. The methodology starts in bubble 230. From bubble 230, the methodology advances to decision block 232 and determines if the control methodology is in run fuel mode, for example, by looking for a flag. If not, the methodology advances to bubble 234 and exits. If so, the methodology advances to block 236 and calculates a new run fuel injection pulsewidth based on FIGS. 2 through 6. The methodology then advances to block 238 and retrieves a value for FFV fuel compensation from a two-dimensional table stored in memory by using a percentage of methanol from the sensors as the interpolation parameter. The methodology then advances to block 240 and uses the value for FFV fuel compensation as a multiplier to obtain a new value for the run fuel injector pulsewidth. This new run fuel injector pulsewidth value is then sent by the engine controller 14 to the fuel injectors 16. The methodology next advances to bubble 234 and exits back to block 38.

In block 42, to calculate the FFV pumping efficiency multiplier value, the methodology checks and determines that the routine is in the run fuel mode, for example, by looking for a flag. The methodology will then calculate the run fuel injector pulsewidth value as previously described. Next, the methodology will look up the pumping efficiency multiplier from a 3-D surface of calibration values stored in memory. The 3-D surface is based on 17 RPM intervals, 9 percent methanol intervals, and a multiplier within a predetermined range. The pumping efficiency multiplier is then obtained from the 3-D surface and multiplied by the run fuel injector pulsewidth previously calculated to obtain a new run fuel injector pulsewidth. The methodology then returns back to block 42 of FIG. 2.

In block 34, the methodology calculates the B-curve FFV vaporization compensation multiplier to compensate for the FFV fuel blend vaporization. This multiplier affects the cold enrichment pulsewidth which, in turn, modifies the base run fuel injection pulsewidth values before the fuel is delivered. The methodology first determines if the methodology for the engine 12 is in the run fuel mode, for example, by looking for a flag. If so, the methodology calculates the run fuel injection pulsewidth value as previously described. The B-curve component of the cold enrichment pulsewidth multiplier is then located from a three-dimensional surface of calibration values stored in memory. The B-curve FFV vaporization compensation multiplier value is based upon the coolant temperature (CLTEMP), the percent of methanol (PRMETH) in the fuel mixture and a multiplier value. This BVAP3D multiplier value is then multiplied by the run fuel injection pulsewidth previously calculated to create a new run fuel injection pulsewidth previously calculated.

In block 36, the methodology calibrates the A-curve FFV vaporization multiplier to compensate for the FFV fuel blend vaporization. This multiplier affects the cold/time enrichment pulsewidth which, in turn, modifies the base run fuel injection pulsewidth values before the fuel is delivered. The A-curve FFV vaporization multiplier is the interpolated multiplier from a 3-D surface of calibration values stored in memory of coolant temperature versus the percent methanol. The methodology first determines if the methodology for the engine 12 is in the run fuel mode. If so, the methodology calculates the run fuel injection pulsewidth previously described. The A-curve FFV vaporization multiplier is located from the A-curve three dimensional surface by using coolant temperature and percent methanol as the interpolation parameters. This A-curve FFV vaporization multiplier value is then multiplied by the run fuel injection pulsewidth previously calculated used to create a new run fuel injection pulsewidth.

In blocks 40 and 176, the methodology will adjust the transient run fuel injection pulsewidth value for the differences in intrinsic vaporization characteristics between varying gasoline and methanol fuel blends. A multiplier term for transient run fuel injection pulsewidth will modify the run fuel injection pulsewidths before the injections are delivered by the fuel injectors 16. The methodology will determine the transient run fuel injection pulsewidth value from a three-dimensional surface of calibration values stored in memory using coolant temperature and percent methanol as the interpolation parameters. The three-dimensional surface of calibration values represents the differences in vaporization characteristics between varying blends of gasoline and methanol at various temperatures. The transient run fuel injection pulsewidth value causes the run fuel injection pulsewidths to be increased with both higher methanol content and colder temperatures.

In blocks 84 and 96, the methodology determines the $O_2$ controller factor which compensates for the natural lean bias which occurs with fuels containing a high percentage of methanol. The methodology adds four calibratible constants to the run fuel injection pulsewidths. These constants include the percent methanol oxygen biasing trigger level, the rich primary limit percent methanol bias, the lean primary limit percent methanol bias, and the cell mask which will dictate the primary limit cells to be affected. The methodology determines if the percent methanol is greater than the percent methanol oxygen biasing trigger level. Then, the methodology applies the rich primary limit percent methanol bias to the oxygen controller rich primary limits as specified by the cell mask and also apply the lean primary limit percent methanol bias to the oxygen controller lean primary limits as specified by the cell mask.

Figure 9:
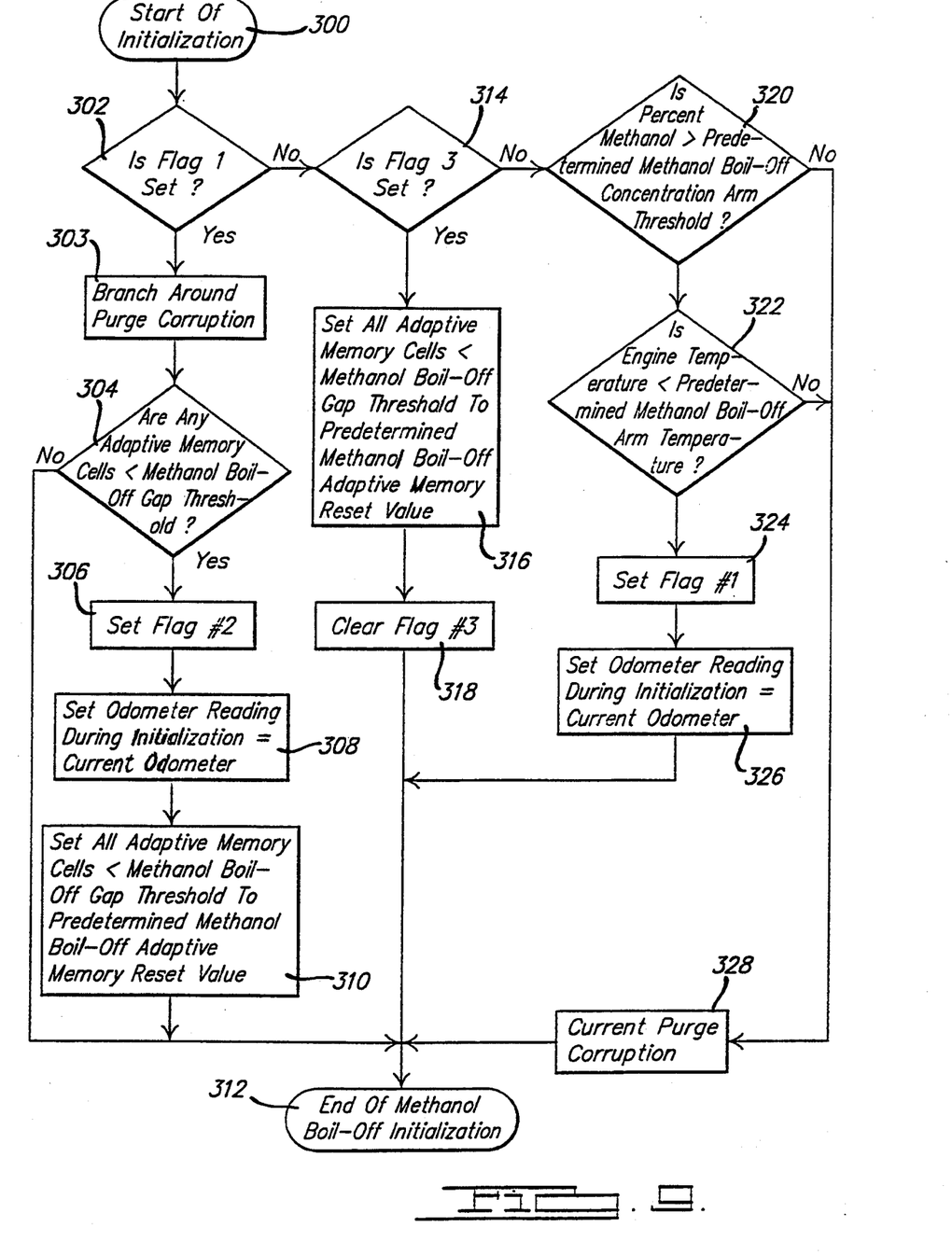
FIGS. 9 through 11 are flowcharts of a subroutine for the method of FIGS. 2 and 3.

Referring to FIG. 9, the methodology determines the adaptive memory factor in blocks 82 and 84 according to a methanol boil-off compensation initialization routine. The methodology begins initialization in block 300. From block 300, the methodology advances to decision block 302 and determines if flag one (1) is set. Flag one (1) arms the purge corruption and MEOH boil-off. If flag one is set, the methodology advances to block 303 and branches around or disables the other actuators 21. The methodology then enters decision block 304 and determines if there are any adaptive memory (AM) cells less than a methanol boil-off gap threshold. If there are any adaptive memory cells less than the methanol boil-off gap threshold the methodology advances to block 306 and sets flag 2 which is the MEOH boil-off underway flag. The methodology advances to block 308 and sets an odometer reading during initialization equal to the current odometer reading by the sensors 18. The methodology then advances to block 310 and sets all the adaptive memory cells less than the methanol boil-off gap threshold to a predetermined methanol boil-off adaptive memory reset value, such as ±50% base fuel pulse width. In decision block 304, if there are not any adaptive memory cells less than the methanol boil-off gap threshold, and after block 310, the methodology advances to block 312 and ends the initialization.

In decision block 302, if flag one is not set, the methodology advances to decision block 310. In decision block 314, the methodology determines if flag three (3), the MEOH boil-off clean up flag, is set. If flag three is set, the methodology advances to block 316 and sets all of the adaptive memory cells less than the methanol boil-off gap threshold to the predetermined methanol boil-off adaptive memory reset value. The methodology next advances to block 318 and clears flag three. The methodology then advances to block 312 previously described.

In decision block 314, if flag three is not set, the methodology advances to decision block 320 and determines if the percentage of methanol in the fuel from sensors 18 is greater than a predetermined methanol boil-off concentration arm threshold stored in memory. If so, the methodology advances to decision block 322 and determines whether the engine temperature, determined by sensors 18 is less than a predetermined methanol boil-off arm temperature such as 10° F. If so, the methodology advances to block 324 and sets flag one. The methodology then advances to block 326 and sets the odometer reading during initialization, equal to the current odometer reading. The methodology, then advances to block 312, previously described.

In decision block 320, if the percent methanol is not greater than a predetermined methanol boil-off concentration arm threshold, or in decision block 322, if engine temperature is not less than a predetermined methanol boil-off concentration arm threshold, the methodology advances to block 328 and enables the other actuators 21 for purge corruption and resets the adaptive memory cells. The methodology then advances to block 312 previously described.

Figure 10:
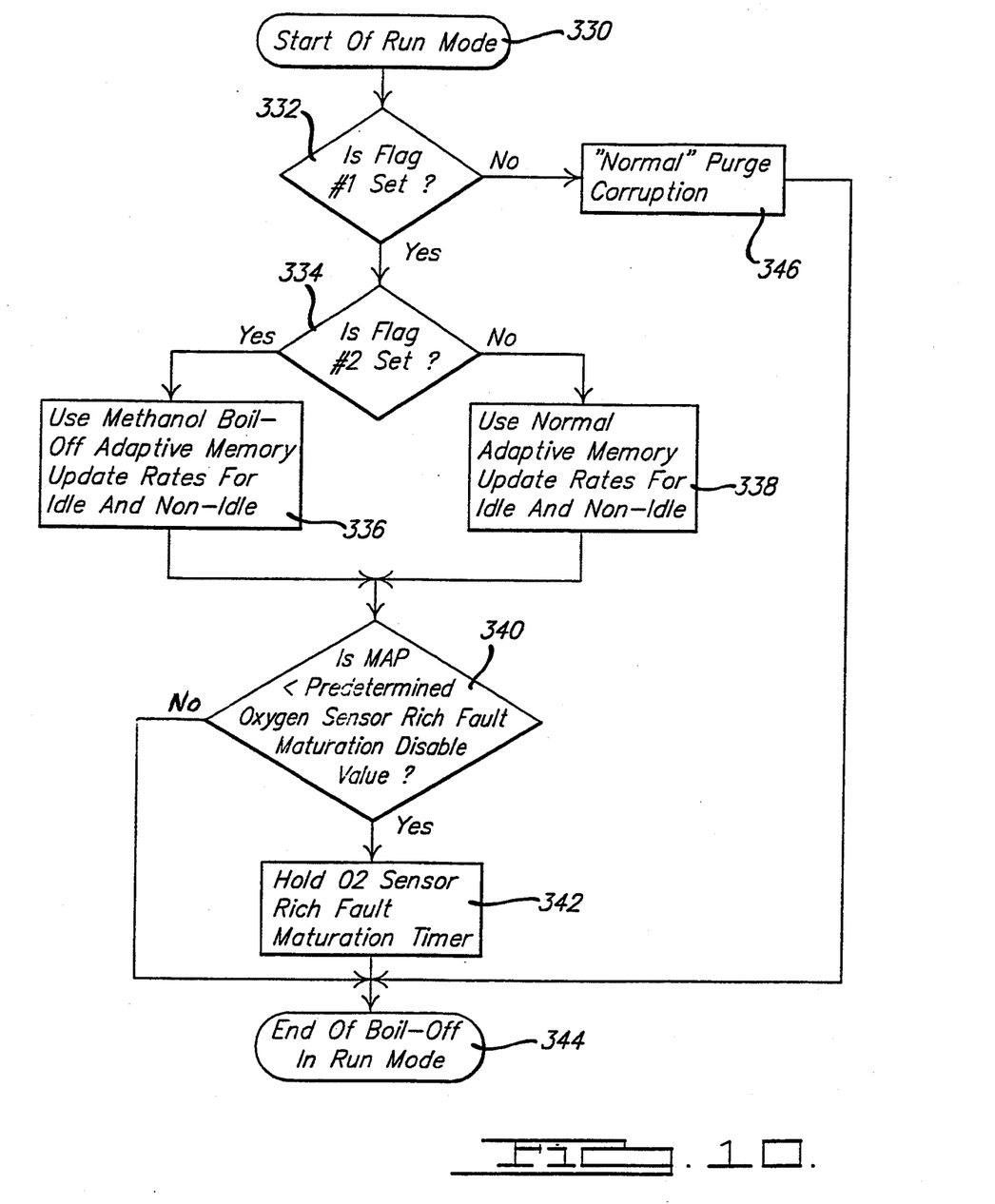

Referring to FIG. 10, after initialization, the methodology executes the run mode of the methanol boil-off compensation. The methodology begins in block 330 and advances to decision block 332 and determines if flag one is set. If flag one is set, the methodology advances to decision block 334 and determines if flag two is set. If flag two is set, the methodology advances to block 336 and uses a predetermined methanol boil-off non-idle fuel adaptive memory update rate and a predetermined methanol boil-off idle fuel adaptive memory update rate stored in memory. If flag two is not set, the methodology advances to block 338 and uses predetermined normal adaptive memory update rates stored in memory. The methodology, from blocks 336 and 338, advances to decision block 340 and determines if MAP is less than a predetermined oxygen sensor rich fault maturation disable (MBO2FD) value such as 400 torr. If so, the methodology advances to block 342 and holds an oxygen sensor rich fault maturation timer at its current value. If not or after block 342, methodology advances to block 344, and ends the run mode.

In decision block 332, if flag one is not set, the methodology advances to block 346 and performs a normal purge corruption where it will update purge free cells. The methodology then enters block 344 and ends the run mode.

Figure 11:
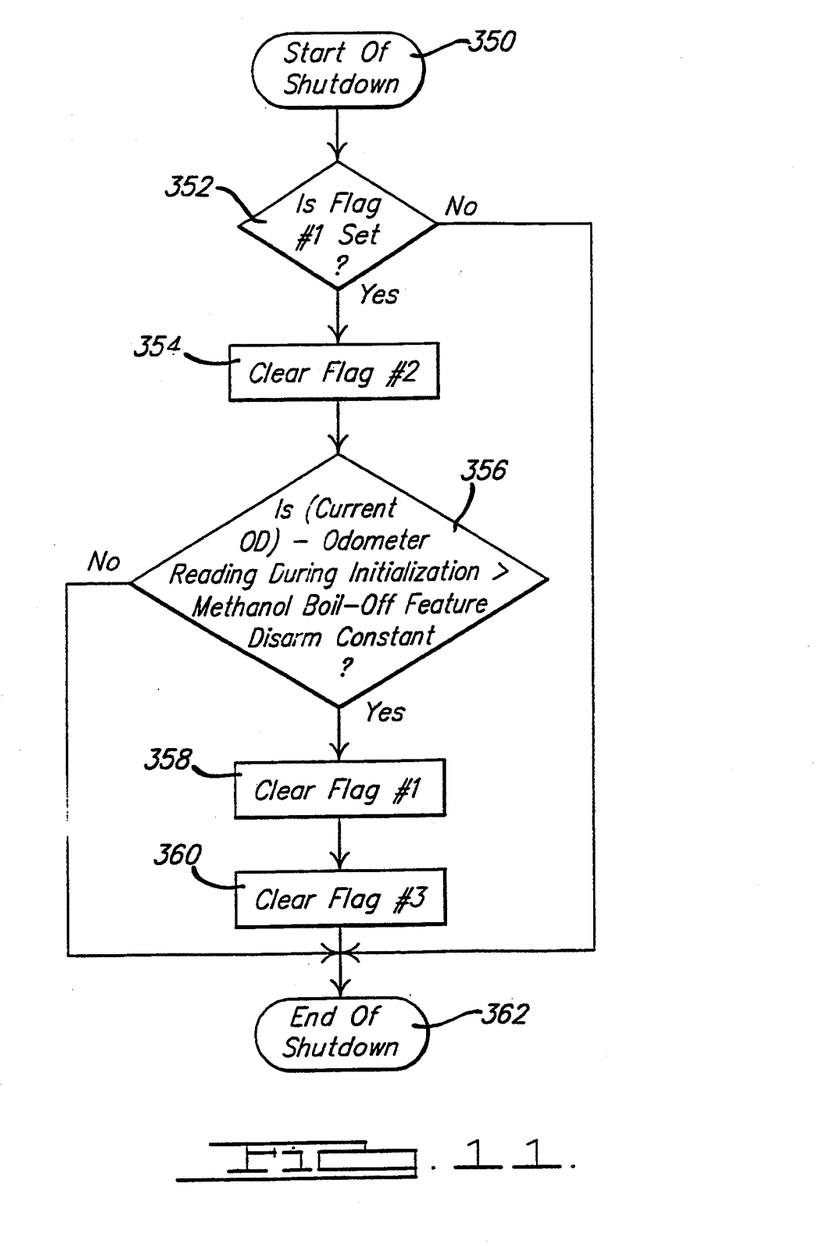

Referring to FIG. 11, after the run mode routine of FIG. 10, the methodology performs a methanol boil-off compensation shutdown routine. The shutdown routine methodology starts in block 350. From block 350, the methodology enters decision block 352 and determines if flag one is set. If flag one is set, the methodology advances to block 354 and clears flag two. The methodology then advances to decision block 356 and determines if the current odometer reading minus the odometer reading during initialization is greater than a predetermined methanol boil-off feature disarm constant stored in memory. If so, the methodology advances to block 358 and clears flag one. The methodology then enters block 360 and clears flag three. The methodology then enters block 362 and ends the shutdown routine.

In decision block 352, if flag one is not set or in decision block 356, the current odometer reading minus the odometer reading during initialization is not greater than the methanol boil-off feature disarm constant, the methodology advances to block 362 and ends the shutdown routine.

Figure 12A:
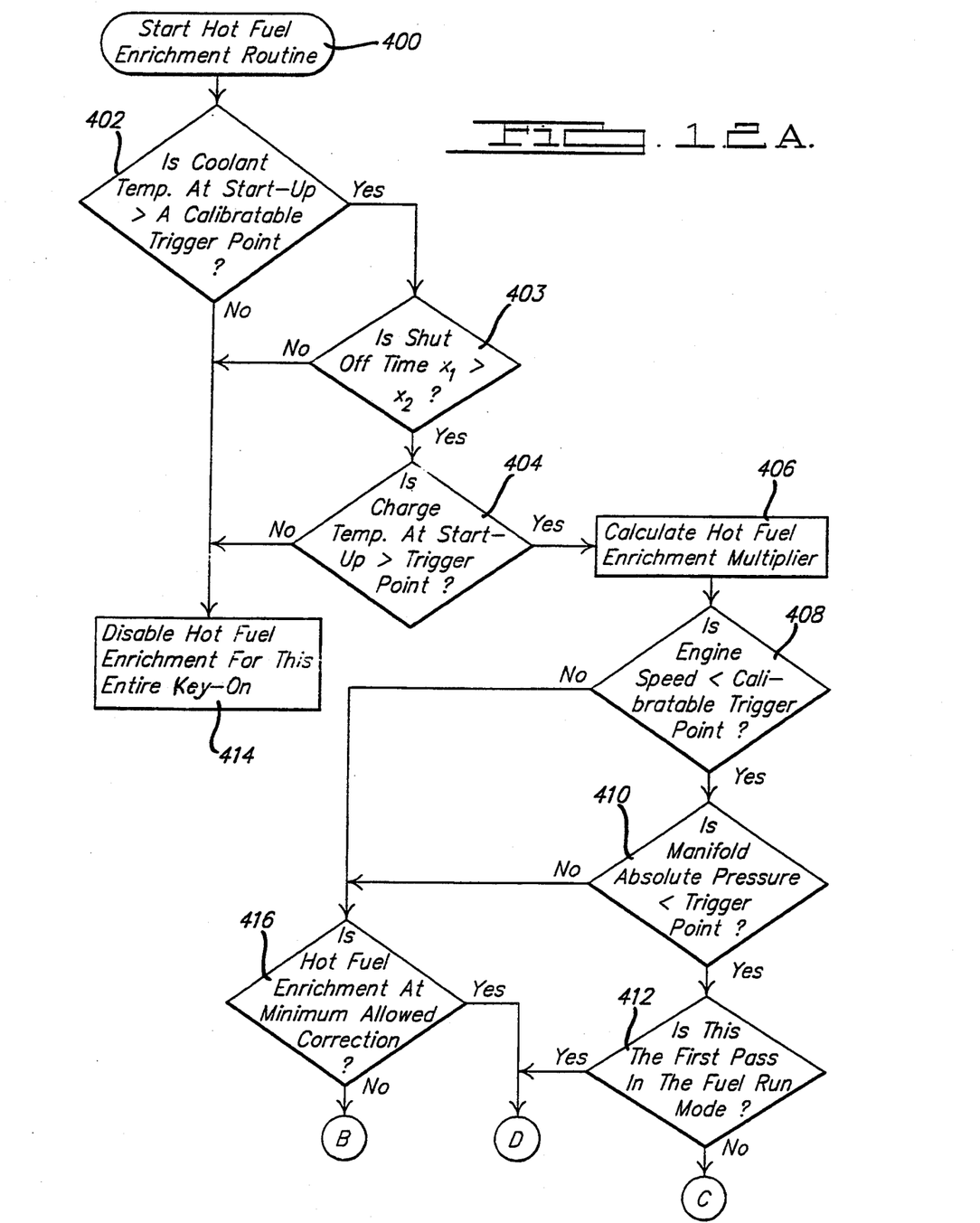
FIGS. 12A and 12B are flowcharts of a subroutine for the method of FIGS. 2 and 3.
Figure 12B:
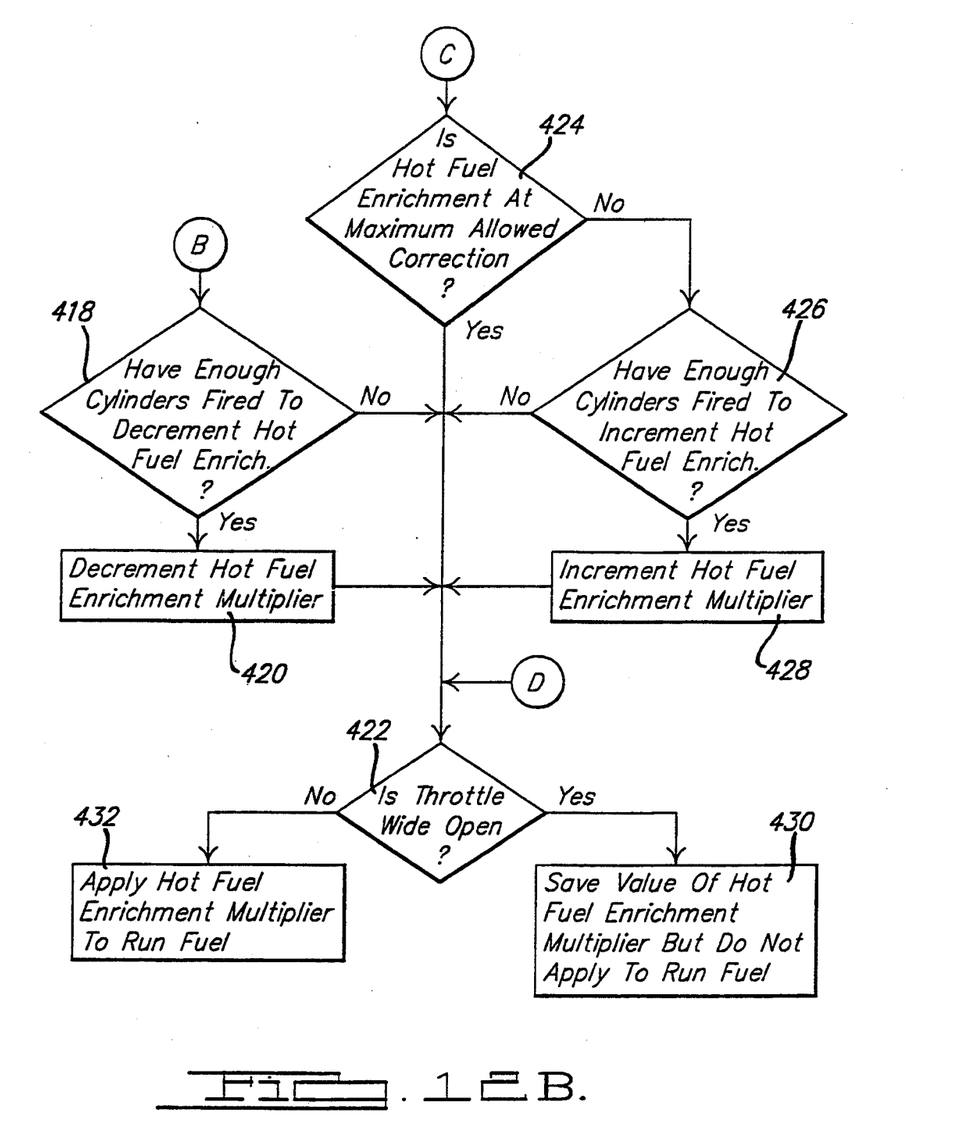

Referring to FIGS. 12A and 12B, a methodology is illustrated which determines the hot fuel enrichment factor of block 78. This factor will eliminate fuel/air control deviations which occur following short soak hot starts and long soak hot starts. The methodology starts in block 400 and advances to decision block 402 to determine if the coolant temperature at start-up is greater than a predetermined hot fuel enrichment enable coolant temperature stored in memory. If the coolant temperature at start up is greater than hot fuel enrichment enable coolant temperature, the methodology advances to decision block 403 and determines whether the shut off time is greater than or predetermined value. If not, the methodology advances to block 414 to be described. If so, the methodology advances to decision block 404 and determines if the charge temperature at start up is greater than a predetermined hot fuel enrichment enable charge temperature stored in memory. If the charge temperature at start-up is greater than the hot fuel enrichment enable charge temperature, the methodology advances to block 406 and calculates a fuel enrichment multiplier. The fuel enrichment multiplier is a function of the percent methanol in the fuel mixture, the charge temperature at start, and the time from start to run transfer. The methodology then advances to decision block 408 and determines if the engine speed is less than a predetermined hot fuel enrichment enable RPM (HFERPM) stored in memory. If the engine speed is less than the hot fuel enrichment enable RPM, the methodology advances to decision block 410 and determines if MAP is less than a predetermined hot fuel enrichment enable MAP level stored in memory. If so, the methodology advances to decision block 412 to be described.

In decision block 402, if the coolant temperature at start up is not greater than the hot fuel enrichment enable coolant temperature, the methodology advances to block 414 and disables the hot fuel enrichment for the entire key-on starting of the engine 12. In decision block 404, if the charge temperature at start-up is not greater than the hot fuel enrichment enable charge temperature, the methodology also advances to block 414 previously described.

Referring to decision blocks 408 and 410, if the engine speed is not less than the hot fuel enrichment enable RPM or MAP is not less than the hot fuel enrichment enable MAP level, the methodology advances to decision block 416. In decision block 416 the methodology determines if a hot fuel enrichment value is at a predetermined minimum allowed correction. If not, the methodology advances to decision block 418 and determines if enough cylinders have fired in order to decrement the hot fuel enrichment multiplier by a predetermined rate as a function of engine speed. If enough cylinders have fired, the methodology advances to block 420 and decrements the hot fuel enrichment multiplier as above-described. The methodology then advances to decision block 422 to be described.

In decision block 412 the methodology determines if this pass is the first pass in the run fuel mode. If so, the methodology advances to decision block 422 to be described. If not, the methodology enters decision block 424. In decision block 424, the methodology determines if the hot fuel enrichment is at a predetermined maximum allowed correction. If so, the methodology advances to decision block 422 to be described. If not, the methodology advances to decision block 426 and determines if enough cylinders have fired in order to increment the hot fuel enrichment multiplier. If so, the methodology advances to block 428 and increments the hot fuel enrichment multiplier of block 406 by a predetermined rate as a function of engine speed. If not or after block 428, the methodology advances to decision block 422.

In decision block 422, the methodology determines if the throttle is at wide open throttle. If so, the methodology advances to block 430 and saves the value of the hot fuel enrichment multiplier of blocks 420 and 428, but it is not applied to the run fuel mode equation or to the fuel injectors 16. If the throttle is not at wide open throttle, the methodology advances to block 432 and applies the hot fuel enrichment multiplier of blocks 420 and 428 to the run fuel equation and delivers additional fuel to the fuel injectors 16.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method of start fuel decay adjustment to a fuel injector pulsewidth in an internal combustion engine capable of using a flexible fuel, said method comprising the steps of:

saving a previous decayed start fuel injector pulsewidth;

calculating a run fuel injector pulsewidth;

determining if the decayed start fuel injector pulsewidth is greater than the run fuel injector pulsewidth;

setting a fuel injector timer with the decayed start fuel injector pulsewidth if the decayed start fuel injector pulsewidth is greater than the run fuel injector pulsewidth;

setting the fuel injector timer with the run fuel injector pulsewidth if the decayed start fuel injector pulsewidth is not greater than the run fuel injector pulsewidth;

interpolating a decay rate of a fuel injector pulsewidth in the fuel injector timer versus a coolant temperature;

multiplying the decay rate by a number of cylinder events since transferring from a start mode to a run mode;

subtracting the decay rate from the decayed start fuel injector pulsewidth;

determining if the decayed start fuel injector pulsewidth is less than or equal to a predetermined value;

disabling the start fuel decay method if the decayed start fuel injector pulsewidth is less than or equal to the predetermined value;

saving the decayed start fuel injector pulsewidth if the decayed start fuel injector pulsewidth is not less than or equal to the predetermined value; and adjusting the flexible fuel being sent to fuel injectors of the internal combustion engine based on the fuel injector pulsewidth in the fuel injector timer.

2. A method of start fuel decay adjustment to a fuel injector pulsewidth in an internal combustion engine capable of using a flexible fuel, said method comprising the steps of:

beginning a start fuel decay feature;

determining if a decayed start fuel injector pulsewidth is greater than a run fuel injector pulsewidth;

determining if the decayed start fuel injector pulsewidth is less than or equal to a predetermined value; and adjusting the flexible fuel being sent to fuel injectors of the internal combustion engine based on either the decayed start fuel injector pulsewidth or the run fuel injector pulsewidth.

3. A method as set forth in claim 2 including the steps of:

saving a previous decayed start fuel injector pulsewidth; and calculating a run fuel injector pulsewidth prior to said step of determining if the decayed start fuel injector pulsewidth is greater than the run fuel injector pulsewidth.

4. A method as set forth in claim 2 wherein said step of determining if the decayed start fuel injector pulsewidth is greater than the run fuel injector pulsewidth includes the step of setting a fuel injector timer.

5. A method as set forth in claim 4 wherein said step of setting the fuel injector timer includes setting the fuel injector timer with the decayed start fuel injector pulsewidth if the decayed start fuel injector pulsewidth is greater than the run fuel injector pulsewidth or setting the fuel injector timer with the run fuel injector pulsewidth if the decayed start fuel injector pulsewidth is not greater than the run fuel injector pulsewidth.

6. A method as set forth in claim 4 including the steps of:

interpolating a decay rate of a fuel injector pulsewidth in the fuel injector timer versus a coolant temperature;

multiplying the decay rate by a number of cylinder events since transferring from a start mode to a run mode; and subtracting the decay rate from the decayed start fuel injector pulsewidth.

7. A method as set forth in claim 2 wherein the step of determining if the decayed start fuel injector pulsewidth is less than or equal to a predetermined value includes the steps of:

disabling the start fuel decay method if the decayed start fuel injector pulsewidth is less than or equal to the predetermined value; and saving the decayed start fuel injector pulsewidth if the decayed start fuel injector pulsewidth is not less than or equal to the predetermined value.

8. A method of start fuel decay adjustment to a fuel injector pulsewidth in an internal combustion engine capable of using a flexible fuel, said method comprising the steps of:

determining if a decayed start fuel injector pulsewidth is greater than a run fuel injector pulsewidth;

setting the fuel injector timer with the decayed start fuel injector pulsewidth if the decayed start fuel injector pulsewidth is greater than the run fuel injector pulsewidth or setting the fuel injector timer with the run fuel injector pulsewidth if the decayed start fuel injector pulsewidth is not greater than the run fuel injector pulsewidth; and adjusting the flexible fuel being sent to fuel injectors of the internal combustion engine based on either the decayed start fuel injector pulsewidth or the run fuel injector pulsewidth.

9. A method as set forth in claim 8 including the steps of:

saving a previous decayed start fuel injector pulsewidth; and calculating a run fuel injector pulsewidth prior to said step of determining if the decayed start fuel injector pulsewidth is greater than the run fuel injector pulsewidth.

10. A method as set forth in claim 8 including the steps of:

interpolating a decay rate of a fuel injector pulsewidth in the fuel injector timer versus a coolant temperature;

multiplying the decay rate by a number of cylinder events since transferring from a start mode to a run mode; and subtracting the decay rate from the decayed start fuel injector pulsewidth.

11. A method as set forth in claim 8 including the step of determining if the decayed start fuel injector pulsewidth is less than or equal to a predetermined value prior to said step of adjusting.

12. A method as set forth in claim 11 wherein the step of determining if the decayed start fuel injector pulsewidth is less than or equal to a predetermined value includes the steps of:

disabling the start fuel decay method if the decayed start fuel injector pulsewidth is less than or equal to the predetermined value; and saving the decayed start fuel injector pulsewidth if the decayed start fuel injector pulsewidth is not less than or equal to the predetermined value.

* * * * *